United States Patent Office 3,043,653
Patented July 10, 1962

3,043,653
RECOVERY OF URANIUM FROM ZIRCONIUM-URANIUM NUCLEAR FUELS
Theodore A. Gens, Oak Ridge, Tenn., assignor to the United States of America as represented by the United States Atomic Energy Commission
No Drawing. Filed July 8, 1960, Ser. No. 41,706
4 Claims. (Cl. 23—14.5)

The present invention relates to an improved process for recovering and separating uranium from solid zirconium-uranium metallic mass. The invention is particularly adapted for use in reprocessing zirconium-clad nuclear reactor fuels.

For solid uranium to be useful as a reactor fuel, it must be clad or sheathed with another metal to keep the reactor coolant from contact with the uranium and from nuclear fission products thereof. Zirconium and selected zirconium base alloys are now used as cladding materials for fuel elements in a number of nuclear power reactors. The combination of favorable nuclear properties, exceptional corrosion resistance to reactor coolants, relatively high strength at temperatures above about 400° C., and metallurgical compatibility with uranium makes zirconium an excellent choice as a cladding material. As with other solid fuel elements, zirconium-clad uranium-containing elements have only a limited useful life as a reactor fuel and must be periodically removed from the reactor for reprocessing to recover and separate unused fuel and new fuel bred from fertile material.

Several methods have been proposed for reprocessing zirconium-uranium fuel compositions to recover and separate uranium values therefrom. In one such process, of which this invention is an improvement, it has been proposed to convert the zirconium or zirconium alloy portion of the element to volatile zirconium tetrachloride by reaction of the fuel with anhydrous hydrogen chloride at a temperature in the range 350° C.–800° C. Uranium reacts with the hydrogen chloride to form relatively non-volatile uranium trichloride and uranium tetrachloride. The uranium-containing hydrochlorination residue is then subsequently dissolved in nitric acid and the resultant solution is treated by well-known extraction techniques to produce a fission-product decontaminated uranium product which, among other uses, can be refabricated into a fuel element.

The principal advantage of this process is that the zirconium which may comprise the main portion of the fuel element is, along with volatile fission products and fission product halides, removed prior to forming a uranium-containing solvent extraction feed solution. Thus the volume of the feed solution, as well as the volume of organic solvent, wash liquors and resultant radio-active waste solutions, are reduced considerably, as compared to processes in which the entire fuel element is dissolved in halide solutions to form the extraction feed solution. These and other advantages are offset by the fact that excessive uranium losses have been encountered. It has been found that a small but significant percentage of uranium chlorides cannot be dissolved out of the hydrochlorination residue even after contact with refluxing nitric acid solutions. In cases where the hydrochlorination residue still contains some zirconium or niobium, contact with a solution of nitric acid has frequently resulted in hazardous explosions. Moreover, even if the danger of an explosive reaction did not exist and assuming that all of the uranium could be dissolved with a solution of nitric acid, no material has been found which can withstand the high corrosion rates resulting from periodic hydrochlorination at temperatures up to 800° C. followed by contact with a refluxing nitric acid solution.

It is, therefore, the principal object of this invention to remove the foregoing disadvantages by providing a process for the quantitative separation of uranium from a uranium-zirconium composition. Another object of this invention is to provide an improved process for recovering uranium from a neutron irradiated uranium-zirconium nuclear fuel.

With these and other objects in mind, the present invention comprises in a broad aspect, a method for separating uranium from a uranium-zirconium metallic mass which comprises, in combination, contacting said mass with anhydrous hydrogen chloride at a temperature in the range 350–800° C. to form gaseous zirconium tetrachloride and a uranium-containing hydrochlorination residue, separating said zirconium tetrachloride from said residue, contacting said residue with gaseous carbon tetrachloride at a temperature in the range 550–650° C. to form a chloride vapor containing the desired uranium values, and thereafter selectively condensing said uranium values from said chloride vapor.

Although this invention may be used to separate uranium from any metallic mass of uranium and zirconium such as a solid mixture or alloy containing uranium and zirconium, the present invention has particular utility in the art of reactor fuel reprocessing to separate and recover uranium from a solid nuclear reactor fuel. Such fuel may comprise a core of metallic uranium or an alloy thereof such as zirconium-uranium alloy, said core being bonded to and/or clad with a zirconium or zirconium alloy. The uranium used may contain the natural isotopic abundance of uranium-235 or may be enriched in the uranium-235 isotope.

In order to practice the present invention, a zirconium-uranium metallic mass which may be typically in the form of a neutron-irradiated zirconium-clad uranium-containing fuel element, is contacted with a stream of anhydrous hydrogen chloride at a temperature in the range 350° C. to 800° C. Under these conditions the hydrochlorination of zirconium proceeds to yield gaseous zirconium tetrachloride and uranium-containing hydrochlorination residue. The zirconium tetrachloride gas is removed from the reaction mixture to a condensation zone where it is condensed to solid zirconium tetrachloride. A filter medium is provided between the reaction zone and the condensation zone to trap any solid uranium values which may be transported with the zirconium tetrachloride leaving the reaction zone. The filter also serves as a condenser for any uranium chloride vapors.

The exact composition of the hydrochlorination residue is uncertain and may vary from run to run depending principally on the composition of the initial charge and quantity of oxygen-containing impurities introduced during hydrochlorination. In general, however, it may be thought to consist of a mixture of uranium chlorides, principally uranium trichloride and uranium tetrachloride, a small amount of uranium and zirconium oxides, oxychlorides, carbides and nitrides, and unreacted uranium and zirconium. Now it is well known that uranium and the uranium compounds mentioned above are readily soluble in aqueous nitric acid solutions. Yet it has been found that even after prolonged contact of such uranium-containing residues with refluxing solutions of nitric acid up to about ten molar, the uranium is not completely dissolved. Small but significant percentages of uranium remain insoluble. Since the ratio of uranium to zirconium in many nuclear reactor fuel elements is generally small, a large percentage loss can be caused by the loss of only a small concentration of uranium. A process for the dissolution of zirconium-containing fuel elements by hydrochlorination of the zirconium followed by the attempted dissolution of the uranium residue in nitric acid solutions is disclosed in "Reactor Fuel Processing," volume II, No. 1, page 7, January 1959.

In accordance with the present invention all of the uranium-containing hydrochlorination residue can be recovered by treatment of said residue with gaseous carbon tetrachloride at a temperature in the range 550–650° C. to form a uranium-containing gas consisting principally of uranium tetrachloride. By condensing the said gaseous uranium values at a temperature in the range 300 to 400° C. at approximately one atmosphere pressure, a solid uranium chloride product essentially free of zirconium is obtained. This uranium chloride product, in marked contradistinction to the uranium-containing hydrochlorination residue, will dissolve completely in dilute aqueous nitric acid solutions. The resultant uranyl nitrate solution may then serve as a feed solution for a solvent extraction process to obtain a highly purified uranium product. A typical extraction process which can be used for this purpose is described in "Symposium on the Reprocessing of Irradiated Fuels," Brussels, 1957, Book 1, page 152, TID–7534, Technical Information Service, Oak Ridge, Tennessee (1957). Alternatively, the uranium chloride product may be purified by fluorination with elemental fluorine or with a liquid fluorinating agent such as chlorine trifluoride, bromine trifluoride, or bromine pentafluoride to convert the uranium to uranium hexafluoride and, by subsequent fractional distillation, a purified uranium hexafluoride can be recovered. A fluoride volatility process useful for the recovery of uranium by fractional distillation is disclosed in U.S. Patent 2,830,873, of common assignee.

Having described the invention in general terms, it will now be illustrated in further detail by the following examples:

Example I

A uranium-containing sample was placed in a porcelain boat and the boat, in turn, was placed in a three-foot long quartz tube. The sample consisted of the hydrochlorination residue resulting from the hydrochlorination of a zirconium-clad reactor fuel specimen with anhydrous hydrogen chloride at a temperature in the range 400° C. to 700° C. The quartz tube was separated into two sections, a heated section and a cool section containing a glass wool filter. A thermostatically controlled cooling zone was maintained in the tube at a temperature below the sublimation point of uranium tetrachloride. One end of the tube was attached to a source of anhydrous hydrogen chloride and the other end was connected to an exhaust means to remove reaction product gases other than uranium tetrachloride. The section containing the porcelain boat with the sample therein was enclosed by a tube furnace. A thermocouple activated by a temperature controller was placed in a thermocouple well which extended into the tube to a point over the porcelain boat. At the start of the run, the quartz tube was purged of air by flowing a stream of hydrogen chloride therethrough. The furnace was then raised to the desired reaction temperature (550–600° C.) while continuously flowing a carrier gas saturated with carbon tetrachloride vapor through the tube. The uranium tetrachloride was deposited on the walls of the cool section of the tube and the unreacted hydrogen chloride and other gaseous reaction products were removed by the exhaust means. After the reaction had been completed, the tube was cooled to room temperature, the uranium tetrachloride deposit was washed from the quartz tube with 1–3 M $HNO_3$, and the resulting solution was analyzed for uranium. All of the uranium from the hydrochlorination residue was found in the nitric acid solution. The experiment was repeated with several other hydrochlorinated reactor fuel samples in the same manner, except that the chlorination temperature and carrier gas were varied as indicated hereinafter. The results are summarized in Table I below.

TABLE I

*Recovery of Uranium From Hydrochlorination Residues by Chlorination With Carbon Tetrachloride*

| Run No.[1] | Temperature, °C. | Percent U in Hydrochlorination Sample | Carrier Gas | Total Time of Chlorination, Hours | Percent U Recovered in $HNO_3$ Solution | Quantity of $CCl_4$, Multiple of Stoichiometric |
|---|---|---|---|---|---|---|
| 1 | 400 | 70 | HCl | 1.0 | 0 | 20 |
| 2 | 500 | 70 | HCl | 1.0 | 25 | 20 |
| 3 | 550 | 13.4 | HCl | 3.0 | 100 | |
| 4 | 550–600 | 13.4 | HCl (no $CCl_4$) | 2.0 | 0 | |
| 5 | 600 | 13.4 | $N_2$ | 0.8 | 100 | 20 |
| 6 | 600 | 13.4 | HCl | 1.0 | 100 | 11 |
| 7 | 600 | 57.8 | $N_2$ | 1.1 | 100 | 7.4 |
| 8[2] | a 375 | 13.4 | HCl | 5 | 0 | |
| | b 600 | 13.4 | $N_2$ | 1 | 94.3 | |

[1] A fuel containing 1% U, 97% Zr, 2% Sn was used in runs 1 to 6 and 8, and a fuel containing 93.5% U, 5% Zr, 1.5% Nb was used in run 7.
[2] This run, as indicated, was carried out in two steps.

From the data in the above table, it will be seen that substantially all of the uranium was soluble in and recoverable from the nitric acid solutions when the hydrochlorination products were chlorinated at temperatures in the range 550–650° C. with carbon tetrachloride as seen from runs 3 and 5–8. On the other hand, when the samples were chlorinated at temperatures less than 550° C., as in runs 1 and 2, there was a drastically reduced uranium recovery.

Example II

Four grams of a uranium-zirconium alloy containing 7 percent, by weight uranium was placed in a quartz tube of a system similar to the one described in Example I. The quartz reactor tube was gradually heated to a temperature of about 600° C. while continuously passing anhydrous hydrogen chloride over the sample. In this case the entire tube was maintained at a temperature above the sublimation point of zirconium tetrachloride to permit its removal by the exhaust means. After 2 hours the flow of hydrogen chloride was stopped. A section of the tube on either side of the filter was then arranged to be maintained at a temperature below the sublimation point of uranium tetrachloride (i.e., less than about 300° C.). A stream of nitrogen saturated with carbon tetrachloride was then introduced into the tube while maintaining the temperature therein at about 600° C. After one hour the flow of gas was stopped and the tube was cooled to room temperature. The uranium values, which had deposited along the walls of the cooled section of the tube and had condensed within the filter, were then washed with a dilute solution of nitric acid. The resulting solution was analyzed for uranium and found to contain 99.99 percent of the uranium content in the sample. The same procedure was repeated with three other samples and the results are summarized in Table II below:

TABLE II

| Run No. | Percent Uranium Recovery | Percent Zirconium in Nitric Acid Solution |
|---|---|---|
| A | >99.9 | 2.5 |
| B | 99.99 | 1.1 |
| C | 99.99 | 0.1 |
| D | >99.9 | 0.15 |

In cases where the original samples are neutron irradiated fuel elements, the final nitric acid solution will contain uranium contaminated with fission products. Therefore, to obtain a decontaminated and purified uranium product, the nitric acid solution will have to undergo further treatment to remove said fission products. In such cases the said nitric acid solution will, in effect, constitute the feed solution for a solvent extraction process.

Alternatively, the chlorinated uranium product may be fluorinated to form uranium hexafluoride and subsequently decontaminated and purified by a selective distillation process as previously indicated.

It is to be understood that the foregoing disclosure of this invention is to be regarded as illustrative only and is in no way to be construed as limitations thereon. It will also be apparent to those skilled in the art that the general procedure set out above is susceptible of numerous modifications within the scope of the present invention.

I claim:

1. In a process for separating uranium from a uranium-zirconium metallic mass in which the initial steps comprise contacting said composition with anhydrous hydrogen chloride in a reaction zone at a temperature in the range 350° C. to 800° C. to form volatile zirconium tetrachloride and a uranium-containing nitric acid insoluble hydrochlorination residue and wherein said zirconium tetrachloride is removed from said reaction zone, the improvement which comprises contacting said nitric acid insoluble hydrochlorination residue with gaseous carbontetrachloride at a temperature within the range 550° C. to 600° C. to form a uranium chloride vapor, and thereafter condensing said vapor in a condensation zone.

2. In a process for separating uranium from a neutron-irradiated uranium-zirconium element in which the initial steps comprise contacting said composition in a reaction zone with anhydrous hydrogen chloride at a temperature within the range 350° C. to 800° C. to form volatile zirconium tetrachloride and a uranium-containing nitric acid insoluble hydrochlorination residue and wherein said zirconium tetrachloride is removed from said reaction zone, the steps which comprise contacting said uranium-containing nitric acid insoluble hydrochlorination residue with gaseous carbon tetrachloride at a temperature within the range 550° C. to 600° C. to form a uranium chloride containing gas, removing said gas from said reaction zone and thereafter selectively condensing uranium values from said gas in a condensation zone.

3. The process according to claim 2 wherein the said condensed uranium chloride is dissolved in a solution of nitric acid to form a solvent extraction feed suitable for extracting uranium values therefrom.

4. The process according to claim 2 wherein the said condensed uranium chloride values are fluorinated to uranium hexafluoride and thereafter fractionally distilling the thus formed uranium hexafluoride to obtain a decontaminated purified uranium product.

References Cited in the file of this patent

UNITED STATES PATENTS

| | | |
|---|---|---|
| 2,582,941 | Wilder | Jan. 15, 1952 |
| 2,725,279 | Van Dyke et al. | Nov. 29, 1955 |
| 2,737,439 | Carter | Mar. 6, 1956 |

OTHER REFERENCES

Cullen et al.: "Proceedings of 2nd U.N. Int. Conf. for Peaceful Uses of Atomic Energy," vol. 17, pp. 273–275, 289, September 1958.

Gens: "Nuclear Science Abstracts," vol. 14, Abstract No. 4380, March 15, 1960 which refers to AEC Report CF-59-4-9, April 10, 1959, 9 pages.

Katz et al.: "The Chemistry of Uranium," pp. 455, 456, 460, 464–469, 485, 486, 489, 490, 494 (1951).